United States Patent
Cho (10) Patent No.: US 8,694,509 B2
(45) Date of Patent: Apr. 8, 2014

(54) METHOD AND APPARATUS FOR MANAGING FOR HANDWRITTEN MEMO DATA

(75) Inventor: Sung Jae Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/547,581

(22) Filed: Jul. 12, 2012

(65) Prior Publication Data

US 2013/0018870 A1  Jan. 17, 2013

(30) Foreign Application Priority Data

Jul. 12, 2011  (KR) .................. 10-2011-0068932

(51) Int. Cl.
*G06F 17/30* (2006.01)
*G06K 9/00* (2006.01)

(52) U.S. Cl.
USPC .......................................... 707/745; 382/119

(58) Field of Classification Search
USPC .................................. 707/722; 382/181, 119
See application file for complete search history.

(56) References Cited

U.S. PATENT DOCUMENTS

| 5,878,164 A * | 3/1999 | Brown et al. ................. 382/190 |
| 6,011,873 A * | 1/2000 | Desai et al. ................... 382/245 |
| 6,317,762 B1 | 11/2001 | Okawa et al. |
| 7,778,464 B2 * | 8/2010 | Lee et al. ...................... 382/185 |
| 2005/0222848 A1 | 10/2005 | Napper et al. |

FOREIGN PATENT DOCUMENTS

| JP | 4214164 B2 | 11/2008 |
| KR | 10-1019019 B1 | 3/2011 |

* cited by examiner

*Primary Examiner* — Jacob F Bétit
*Assistant Examiner* — Kristopher Andersen
(74) *Attorney, Agent, or Firm* — Jefferson IP Law, LLP (57) ABSTRACT

A method and apparatus for storing and searching for handwritten memo data in a database in which the handwritten memo data are stored in the form of bit streams representing continuous and discontinuous elements constituting the handwritten memo data are provided. The memo data search method includes receiving an input of memo data, storing the memo data in the form of a bit stream, searching, when a search for the memo data is requested, a memo index database for the memo data, and displaying a search result. The handwritten memo data management method and apparatus stores and searches for the memo data regardless of orientation and size.

18 Claims, 11 Drawing Sheets

1110001111100111...samsung...111100111110111011111111111111111111111011111110001111111111

METHOD AND APPARATUS FOR MANAGING FOR HANDWRITTEN MEMO DATA

PRIORITY

This application claims the benefit under 35 U.S.C. §119(a) of a Korean patent application filed on Jul. 12, 2011 in the Korean Intellectual Property Office and assigned Serial No. 10-2011-0068932, the entire disclosure of which is hereby incorporated by reference.

BACKGROUND OF THE INVENTION

1. Field of the Invention

The present invention relates to a handwritten memo data management method and apparatus. More particularly, the present invention relates to a method and apparatus for storing and searching for handwritten memo data using a database in which the handwritten memo data are registered in a form of bit streams representing continuous and discontinuous elements constituting the handwritten memo data.

2. Description of the Related Art

Recently, mobile terminals are designed to be multimedia devices supporting various supplementary functions such as an electronic organizer function, a gaming function, a music and video playback function, a schedule manager function, and other similar functions. With the increasing diversification of the supplemental functions of the mobile terminal, a user interface facilitating management of the diversified supplementary services should be provided.

Additionally, an increasing number of digital devices support handwriting type input using a stylus and a touchscreen. In this case, the mobile terminal, such as smartphone, can support various handwriting-based applications using a stylus and a touchscreen of the mobile terminal in order to generate handwritten memos. In the related-art method, however, when a user searches for a previously stored handwritten memo, the user opens each of the previously stored memo files, enters, if the handwritten memo is character-recognizable, a keyword, or compares the entered image pattern with those of the previously stored memo files, resulting in a time-consuming and inconvenient search that often produces a bad search results. Thus, there is a need for a method for facilitating search of handwritten memo.

SUMMARY OF THE INVENTION

Aspects of the present invention are to address at least the above-mentioned problems and/or disadvantages and to provide at least the advantages described below. Accordingly, an aspect of the present invention is to provide a handwritten memo data search method and apparatus that is capable storing memo data in the form of a bit stream representing a series of continuous and discontinuous elements constituting the handwritten memo data, thereby facilitating handwritten memo data search.

In accordance with an aspect of the present invention, a memo data search method is provided. The method includes receiving an input of memo data, storing the memo data in the form of a bit stream, searching, when a search for the memo data is requested, a memo index database for the memo data, and displaying a search result.

In accordance with another aspect of the present invention, a memo data search apparatus is provided. The apparatus includes an input unit for receiving an input of memo data, a display unit for displaying a searched memo data, a storage unit, including a memo index database, for storing information on the memo data, and a control unit for controlling converting the memo data into a bit stream, storing the bit stream in the memo index database, searching, when a search for the memo data is requested, the memo index database for the search-requested memo data, and displaying a search result on the display unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the term "memo data" denotes text data, drawing data, signature data composed of at least one of a straight line, a curved line, and a diagram, and other similar data. For example, the text of "SAMSUNG", a sketch of an elephant, and a signature of a girl group may be included the memo data according to an exemplary embodiment of the present invention.

The term "touch" denotes a contact made to an input unit directly or indirectly using an input device, such as an electric pen, a stylus, a finger, and other similar objects and items. A direct touch means to make contact to the input unit directly with the input means, and the indirect touch means to approximate the input means to the input unit in a predetermined range.

As described above, the memo data according to an exemplary embodiment of the present invention may be composed of straight and curved lines and diagrams (e.g. a circle, and a box). According to an exemplary embodiment of the present invention, the memo data is decomposed into continuous and discontinuous elements that are stored in the form of a bit stream expressing the respective continuous and discontinuous elements. When searching for the memo data, the search requested-memo data input by the user is also converted into a bit stream such that the apparatus searches the memo index database for a bit stream of the memo data matching a bit stream of the search-requested memo data.

In the following description of exemplary embodiments of the present invention, the description is directed to a case where the memo data is text. However, the present invention is not limited thereto, and may be applied to the case where the memo data is at least one of a sketch, a signature, and other information entered into and stored by a memo generating application.

Figure 1A:
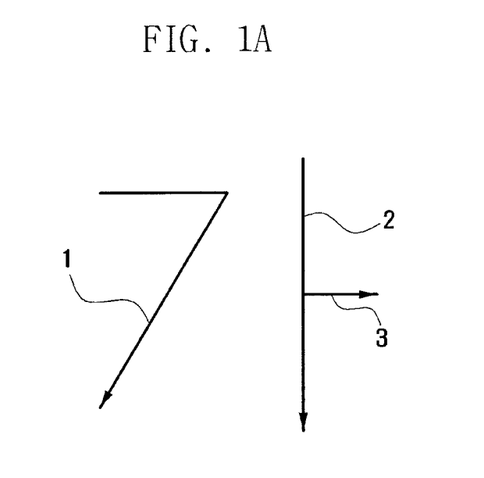
FIGS. 1A and 1B are diagrams illustrating a basic principle of a memo data search method according to an exemplary embodiment of the present invention.
Figure 1B:
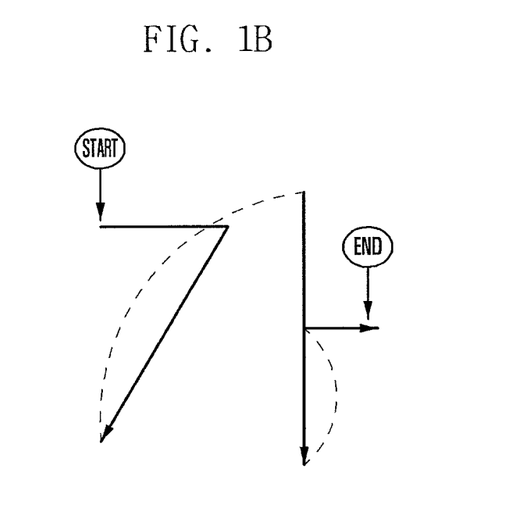

FIGS. 1A and 1B are diagrams illustrating a basic principle of a memo data search method according to an exemplary embodiment of the present invention.

Referring to FIG. 1A, a schematic showing how a user writes an exemplary character is shown. The user makes a touch using a touch input object, such as the user's finger, electronic pen, or stylus, and drags the touch input object on a touchscreen, as shown by line 1. Next, the user releases the touch input object from contacting the touchscreen and makes another touch at another position and drags the touch input object so as to draw a curved line or a straight line, such as line 2. Next, the user releases the contact of touch input object to the touchscreen and makes yet another touch at yet another position with the touch input object and drags the touch input object to draw line 3.

Accordingly, as shown in FIG. 1A, the Korean language character "가" is written, and this character is composed of three continuous elements lines 1, 2, and 3. The character "가" also includes discontinuous elements in addition to the continuous elements. A description is made of the discontinuous elements with reference to FIG. 1B.

Referring to FIG. 1B, a trace of a pen for writing the Korean character "가", which is composed of continuous and discontinuous elements, is shown. The Korean character "가" is drawn so as to have a drawing start point, a drawing end point and discontinuous sections over which the pen jumps without drawing a line, as indicated by the dotted lines in FIG. 1B. The discontinuous section is referred to as a discontinuous element.

Figure 2A:
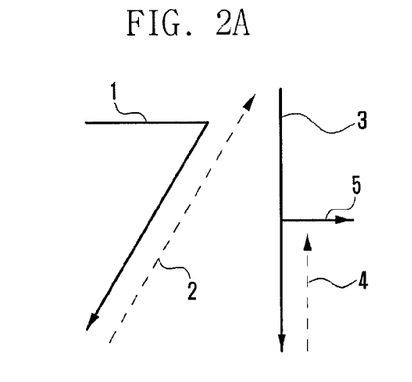
FIGS. 2A to 2C are diagrams illustrating a principle of converting continuous and discontinuous elements constituting a character into bit streams in a handwritten memo data search method according to an exemplary embodiment of the present invention.
Figure 2B:
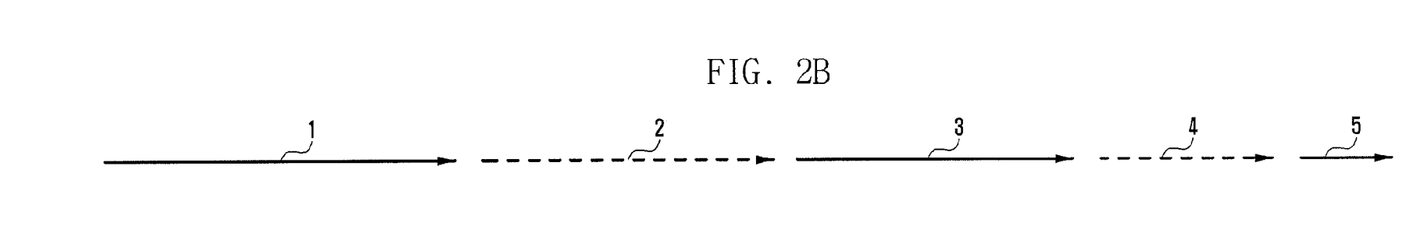
Figure 2C:
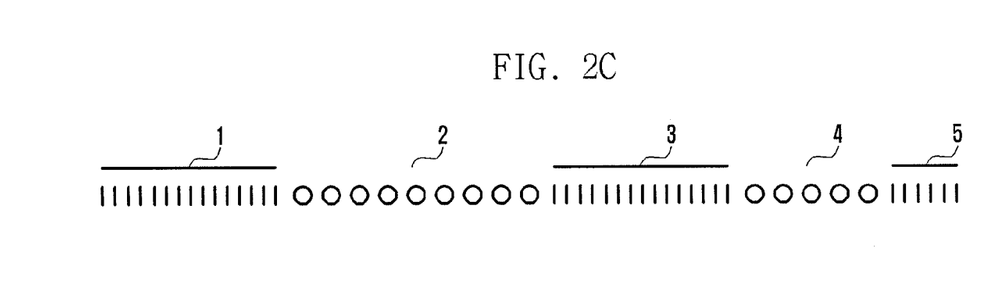

FIGS. 2A to 2C are diagrams illustrating a principle of converting continuous and discontinuous elements constituting a character into bit streams in a handwritten memo data search method according to an exemplary embodiment of the present invention.

Referring to FIG. 2A, a process of how to discriminate between the continuous and discontinuous elements of a character is shown. The character "가" consists of continuous elements 1, 3, and 5 that are shown as solid lines, and discontinuous elements 2 and 4 that are shown as dotted lines. The continuous element 1, having a bent or curved section may be converted into a straightened continuous element having the same length as before being straightened, as shown in FIG. 2B.

In this manner, all of the continuous elements 1, 3, and 5 are straightened and then arranged in series with the discontinuous elements 2 and 4, as show in FIG. 2B. In the present exemplary embodiment of the present invention, the continuous and discontinuous elements 1 through 5 arranged in the series shown in FIG. 2B may be referred to as a character elements stream. In the character elements stream, a continuous element is converted into a bit value 1, and a discontinuous element is converted into a bit value 0.

That is, an input character may be represented by a bit stream of 0s and 1s. In the present exemplary embodiment of the present invention, the input memo data is arranged as a character elements stream, converted into bit values, and stored as a bit stream so as to be compared with the memo data entered and converted into a bit stream in response to a search request. If the search request is input as memo data and converted into a bit stream, it is possible to search a memo index database for a bit stream matching with the bit stream of the memo data.

Figure 3:
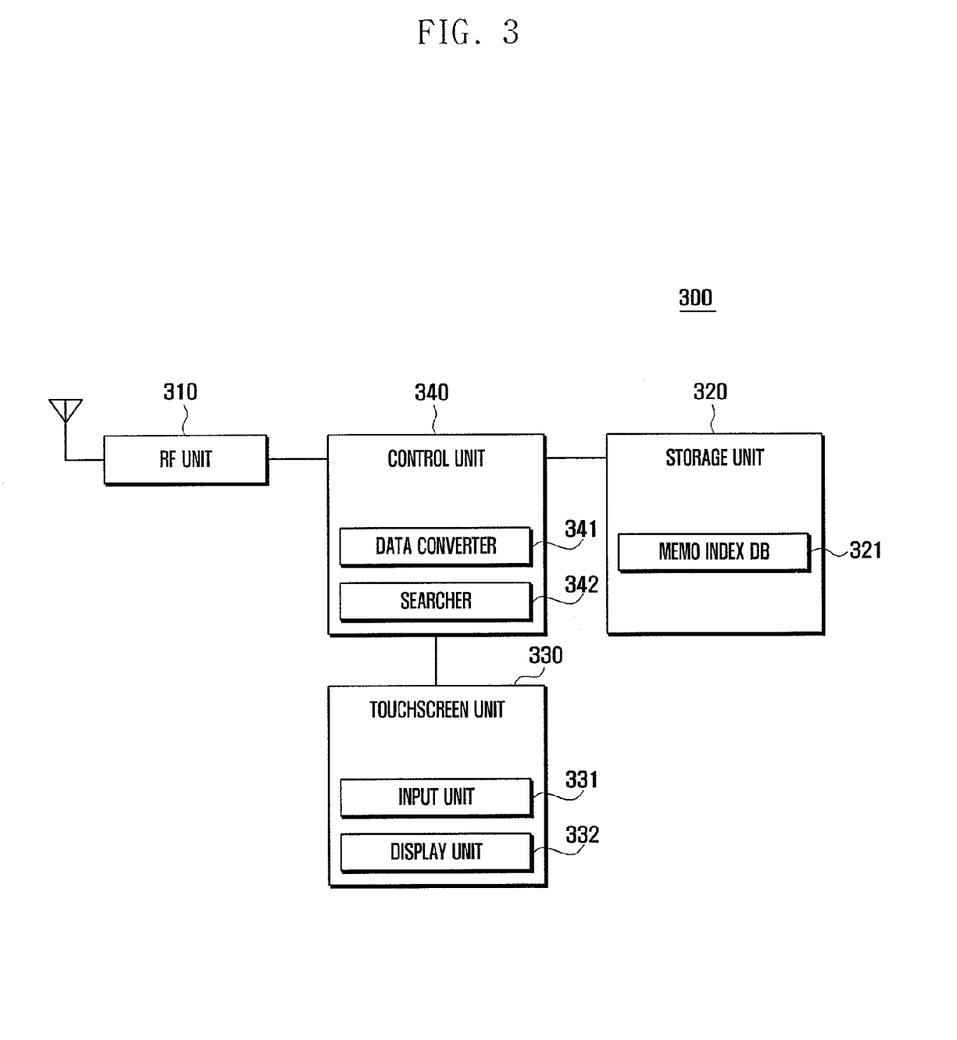
FIG. 3 is a block diagram illustrating a configuration of a memo search apparatus according to an exemplary embodiment of the present invention.

FIG. 3 is a block diagram illustrating a configuration of a memo search apparatus according to an exemplary embodiment of the present invention.

Referring to FIG. 3, a memo search apparatus 300 of the present exemplary embodiment of the present invention includes a Radio Frequency (RF) unit 310, a storage unit 320, a touchscreen unit 330, and a control unit 340.

The RF unit 310 transmits and receives radio signals carrying memo data. The RF unit 310 may include an RF transmitter for up-converting and amplifying a signal to be transmitted and an RF receiver for low noise amplifying and down-converting a received signal. The RF unit 310 also transfers data received on a radio channel to the control unit 340 and transmits data output by the control unit 340 on the radio channel. The RF unit 310 is provided when the memo search apparatus 300 is a mobile terminal or wireless device supporting radio communications. In a case where the memo search apparatus 300 does not support radio communication, the RF unit 310 can be omitted.

The storage unit 320 stores programs and data related to operations of the memo search apparatus 300 and may be divided into a program region and a data region. The program region stores the programs controlling the overall operations of the memo search apparatus 300 and stores an Operating System (OS) for booting up the memo search apparatus 300 and application programs for playing multimedia contents and supporting other optional functions, such as a camera function, an audio playback function, and a still and motion picture playback function. The data region of the storage unit 320 is for storing data generated in the memo search apparatus 300, such as still and motion pictures, a phonebook, and audio data.

According to the present exemplary embodiment of the present invention, the storage unit 320 may store a memo index Database (DB). The memo index DB stores memo data entered by the user as bit streams so as to be searched when matching search-requested memo data with the memo data stored in the memo index DB. The memo search apparatus 300 converts the search-requested memo data into a bit stream and searches the memo index DB for a matching bit stream. According to an exemplary embodiment of the present invention, the memo index BD may include a memo data field and an index field.

The touchscreen unit 330 includes an input unit 331 and a display unit 332. The input unit 331 may be implemented with or include a touch sensor for sensing the touch input made by the user. Here, the touch may be a direct touch or an indirect touch. The direct touch is a contact on the input unit 331 with a touch input object, and the indirect touch is an approximation of the touch input object contacting the input unit 331 when the touch input object is within a predetermined range of the input unit 331.

In a case where the input unit 331 includes the touch sensor, the touch sensor can be implemented with any of a capacitive overlay device, a resistive overlay device, infrared beam technologies, or any other suitable touch sensor devices and technologies enabling detection of a contact of an object on the screen. The input unit 331 receives the touch input and generates a detection signal provided to the control unit 340. The detection signal includes coordinates corresponding to a position where the touch input is made by a user. If the touch is dragged, the input unit 331 generates a detection signal including the coordinates on the path of the drag, and provides the generated detection signal to the control unit 340.

The control unit 340 converts the memo data input using the input unit 331 into a bit stream and stores the bit stream in the memo index database 321. If a memo data search request is detected, the control unit 340 searches the memo index database 321 for the requested memo data and displays a search result on the display unit 332. For this purpose, the control unit 340 may include a data converter 341 and a searcher 342.

The data converter 341 converts a continuous element of an input memo data into one or more bits, in consideration of a length of the continuous element. The data converter 341 also converts a discontinuous element of the input memo data to one or more bits, in consideration of a length of the discontinuous element. In more detail, the data converter 341 detects start and end points of a first touch and a drag path of the touch between the start and end points of the first touch. The data converter 341 straightens the continuous element and calculates a length of the straightened continuous element. The data converter 341 converts the continuous element into a bit stream according to its length.

The data converter 341 also detects the end point of the first touch and a start point of the second touch and calculates a distance of a discontinuous element between the end point of the first touch and the start point of the second touch. Next, the data converter 341 converts the discontinuous element into a bit stream corresponding to a length of the discontinuous element. When no other touch is detected within a predetermined time after the first touch has been released, then the data converter 341 store the converted bit stream in the memo index database 321.

The searcher 342 converts the search-requested memo data into a bit stream and searches the memo index database for memo data corresponding to the bit stream of the search-requested memo data.

Figure 4A:
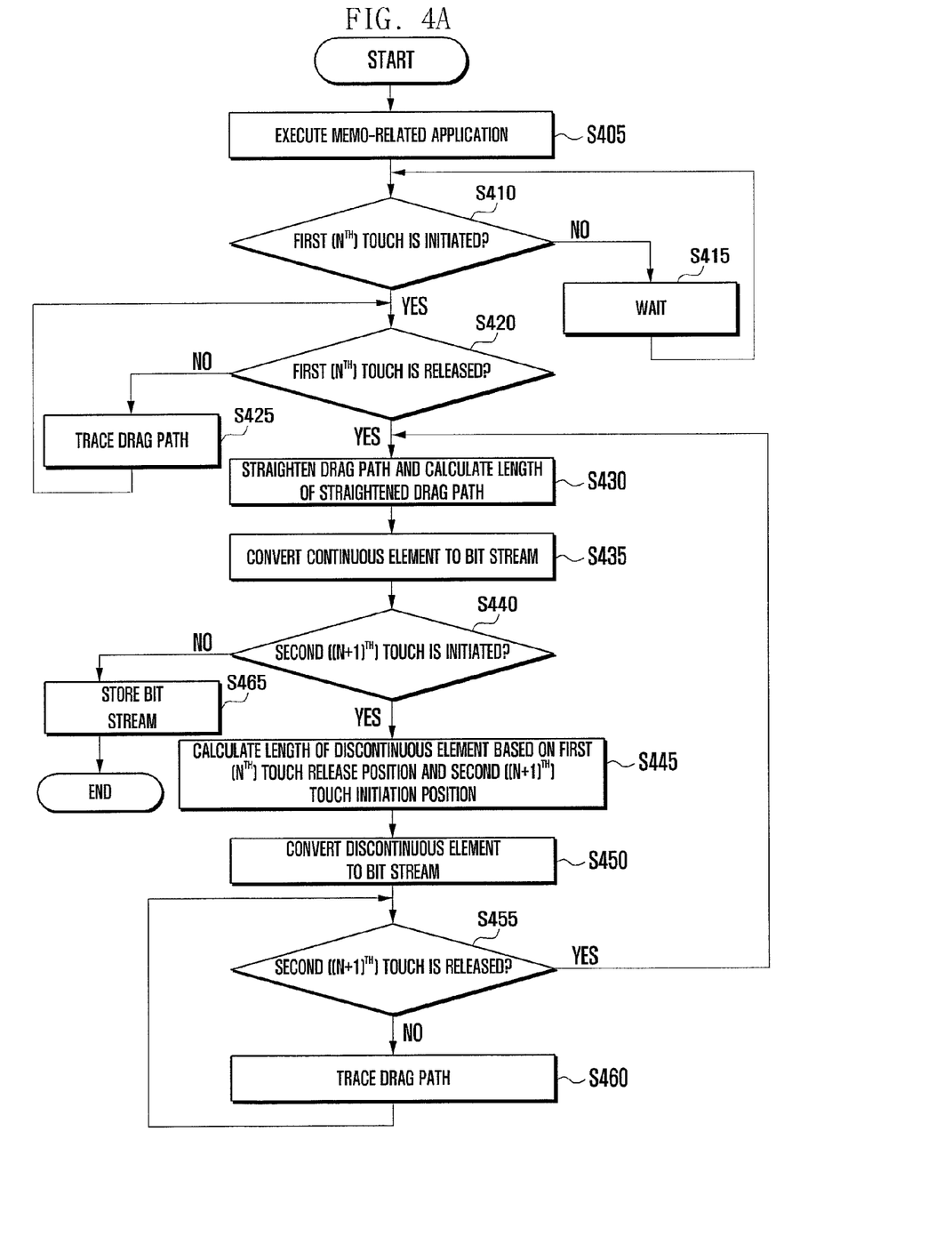
FIG. 4A is a flowchart illustrating a handwritten memo-storing procedure of a handwritten memo data management method according to an exemplary embodiment of the present invention.
Figure 4B:
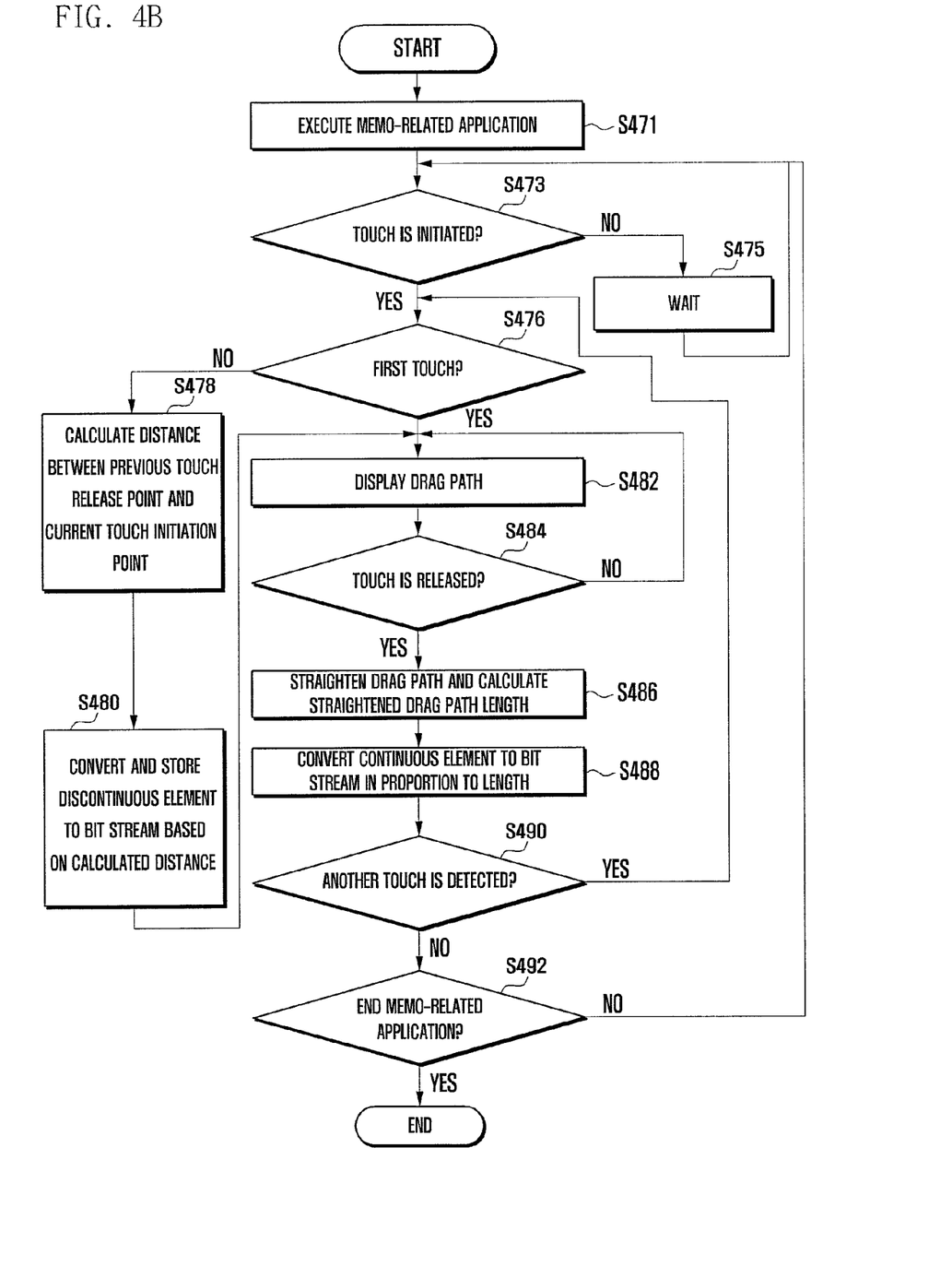
FIG. 4B is a flowchart illustrating a handwritten memo-storing procedure of a handwritten memo data management method according to another exemplary embodiment of the present invention.

FIGS. 4A and 4B are flowcharts illustrating handwritten memo data storing procedures according to the exemplary embodiments of the present invention.

Referring to FIGS. 4a and 4b, the figures are directed to two respective exemplary embodiments corresponding to a principle and an order of operations for storing the entered memo. However, the memo data saving procedure of the present invention is not limited to these two exemplary embodiments, and the principle and the order of operations may be occur in any suitable sequence or order.

FIG. 4a illustrates a handwritten memo-storing procedure of a handwritten memo data management method according to an exemplary embodiment of the present invention. Although touch events are referred to as a first touch and a first touch release and a second touch and a second touch release in FIG. 4a, these events can be generalized to be an $n^{th}$ touch and an $n^{th}$ touch release and an $(n+1)^{th}$ touch and an $(n+1)^{th}$ touch release.

In the present exemplary embodiment of the present invention, the continuous element is a line drawn between a first touch initiation point and a first touch release point. The discontinuous element is a virtual straight line between the first touch release point and a second touch initiation point. The continuous element is converted into a bit stream having a length corresponding to a length of the continuous element, and the discontinuous element is converted into another bit stream having a length of the discontinuous element.

In step S405, the control unit 340 detects execution of a memo-related application. The memo-related application is an application allowing the user to enter a memo and generate memo data and includes a memo application, a messaging application, a Social Network Service (SNS) application, and other similar applications. Next, in step S410, the control unit 340 determines whether a first (or an $n^{th}$) touch is initiated. If the first touch is not initiated, then in step S415, the control unit 340 waits for initiation of the first touch.

If the first touch is initiated, then the control unit 340 determines whether the first touch is released in step S420. If the first touch is not released, this means that the touch includes a drag, and, then, in step S425, the control unit 340 traces a drag path of the drag after the first touch is initiated in step 410. The control unit 340 traces the drag path so as to calculate a length of a continuous element generated by the touch and drag.

If the first touch release is detected in step S420, then the control unit 340 straightens the continuous element, i.e., the line between the first touch initiation point and the first touch release point, and calculates a length of the straightened length of the continuous element in step 430. Next, in step S435, the control unit 340 converts the straightened continuous element into a bit stream of bits each having bit values of "1". A number of bits of the bit stream may vary according to the length of the continuous element. For example, assuming that 1 cm corresponds to one bit, the continuous element having a length of 10 cm is converted into a bit stream of ten bits, and the continuous element having a length of 5 cm is converted into a bit stream of five bits.

Next, the control unit 340 determines whether a second (or an (n+1)$^{th}$) touch is initiated in step S440. If the second touch is not initiated within a predetermined time, then such is interpreted as the memo composition being completed, and thus the control unit 340 saves the generated bit stream in the memo index DB in step S465. If the second touch is initiated within the predetermined time at step 440, then the control unit 340 calculates a length of a discontinuous element, i.e., a virtual straight line between the first touch release point and the second touch initiation point, in step S445.

A difference between the respective calculations of the continuous and discontinuous elements is described below. When calculating the length of the continuous element, the control unit 340 traces a line along the drag path from the first touch initiation point to the first touch release point, straightens the traced line of the drag path, and calculates the length of the straightened line. In a case of the discontinuous element, the control unit 340 draws a virtual straight line between the first touch release point and the second touch initiation point and calculates the length of the virtual straight line.

Next, the control unit 340 converts the length of the discontinuous element into a bit steam in step 450. According to the present exemplary embodiment of the present invention, the control unit 340 converts the length of the discontinuous element into a bit stream of bits each having bit values of "0". The number of bits of the discontinuous element bit stream may vary according to the length of the discontinuous element. For example, assuming that 1 cm corresponds to one bit, the discontinuous element having a length of 15 cm is converted into a bit stream of fifteen bits, and the continuous element having a length of 7 cm is converted into a bit stream of seven bits.

Next, in step S455, the control unit 340 determines whether the second touch is released. If the second touch is not released, this means that the touch includes another drag, and thus the control unit 340 traces another line along another drag path in step S460. The control unit 340 traces the drag path so as to calculate the length of a continuous element generated by the touch and drag. If the second touch release is detected in step S455, then the control unit 340 returns the procedure to step S430.

As described with reference to FIG. 4A, the memo search apparatus discriminates between continuous and discontinuous elements constituting handwritten memo data, converts the continuous and discontinuous elements into respective bit streams, and stores the respective bit streams in a database. Afterwards, the memo search apparatus may search the database for a target handwritten memo data using the stored bit streams.

FIG. 4B is a flowchart illustrating a handwritten memo-storing procedure of a handwritten memo data management method according to another exemplary embodiment of the present invention.

Referring to FIG. 4B, the control unit 340 detects execution of a memo-related application in step S471. Next, in step S473, the control unit 340 determines whether a touch is initiated. If the touch is not initiated, the control unit 340 waits for initiation of a touch in step S475.

If the touch is initiated, then in step S476, the control unit 340 determines whether the initiated touch is a first touch made after the execution of the memo-related application. The control unit 340 determines whether the initiated touch is the first touch in order to calculate a length of the discontinuous element when the touch detected in step S473 is not the first touch.

If the current touch is not the first touch, then, in step S478, the control unit 340 calculates a length of the discontinuous element, i.e., a virtual straight line between a previous touch release point and a current touch initiation point. Next, the control unit 340 converts the discontinuous element length into a bit stream and stores the bit stream in step S480. After storing the conversion result at step S480 or if the current touch is the first touch at step S476, then, in step S482, the control unit 340 displays a drag path in step S482, or in other words, the control unit 340 displays the memo data inputted by the user as the drag path.

Next, in step S484, the control unit 340 determines whether the touch is released. If the touch is not released, then the control unit 340 returns the procedure to step S482 so as to continue displaying the drag path. Otherwise, if it is determined that the touch is released in step S484, then the control unit 340 straightens the drag path and calculates a length of the straightened drag path in step S486. In other words, in step S486, the control unit 340 determines the length of the straightened drag path that is a continuous element. Next, the control unit 340 converts the continuous element into a bit stream corresponding to its length in step S488.

Next, the control unit determines whether another touch is detected in step S490. If another touch is detected, then it is determined that another memo data is being inputted, and the control unit 340 returns the procedure to step S476. Otherwise if no other touch is detected in step S490, then the control unit 340 determines whether a memo-related application termination request is detected in step S492 and, if so, ends the procedure for storing the handwritten memo data, and if no termination request is detected, the control unit 340 returns the procedure to step S473.

Figure 5:
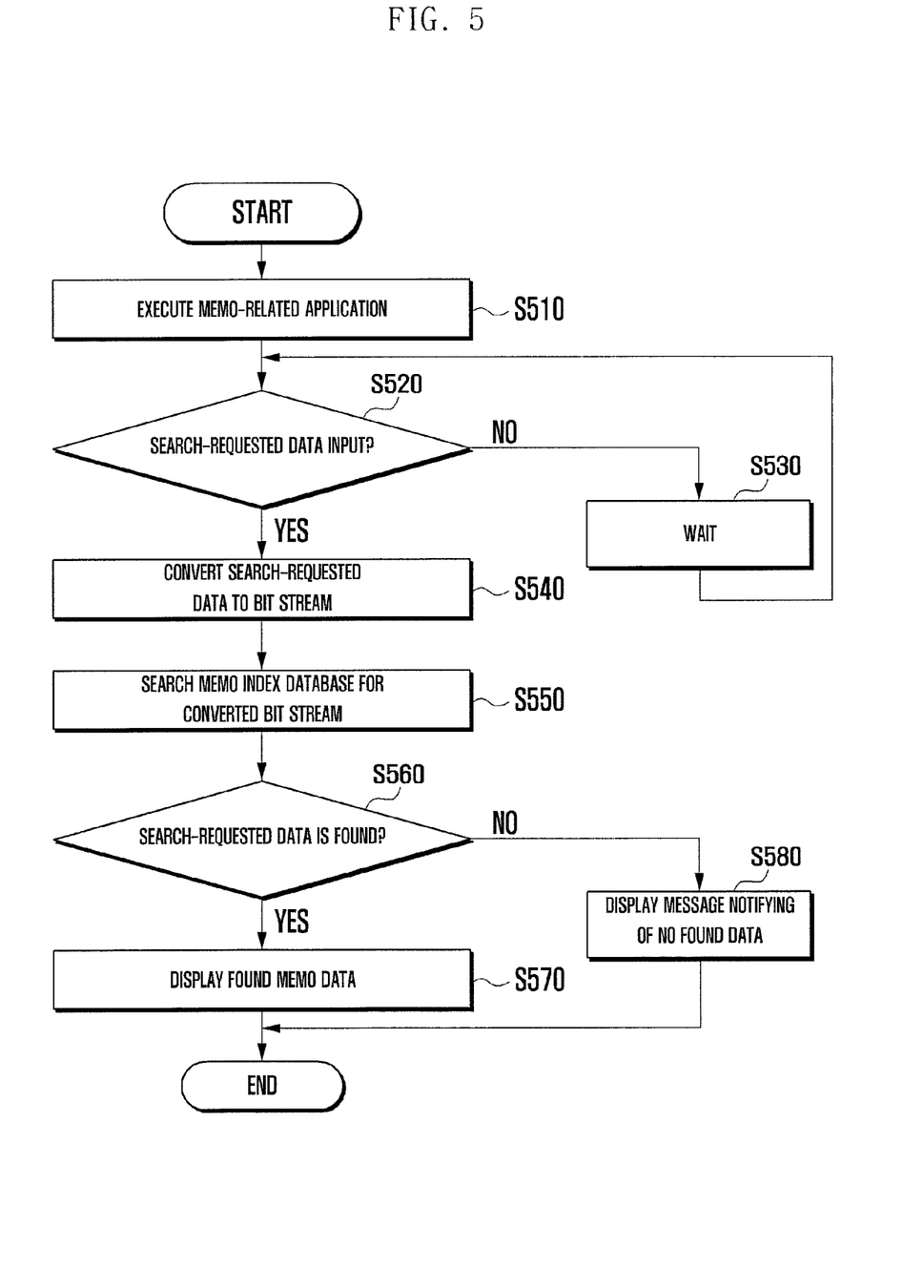
FIG. 5 is a flowchart illustrating a handwritten memo data search procedure of a handwritten memo data management method according to an exemplary embodiment of the present invention.

FIG. 5 is a flowchart illustrating a handwritten memo data search procedure of a handwritten memo data management method according to an exemplary embodiment of the present invention.

Referring to FIG. 5, the control unit 340 first detects the execution of a memo-related application in step S510. Here, the memo-related application may be any of the applications allowing the user to enter memo data, which includes a memo application, a messaging application, a SNS application, or other similar applications allowing for the generation of memo data.

The control unit 340 detects search request data that is input through the input unit 331 in step S520. If no search request data is input, then the control unit 340 waits for the input of search request data in step S530. If a search request data is input in step S520, then the control unit 340 converts the search request data into a corresponding bit stream in step S540. Since the bit stream conversion is performed as described in steps S410 to S460 of FIG. 4, detailed description thereof is omitted with respect to FIG. 5.

Next, in step S550, the control unit 340 searches a memo index DB for a bit stream matching the bit stream of the search request data. According to the present exemplary embodiment of the present invention, the control unit 340 searches the memo index DB for a bit stream of the memo data corresponding, but not equal, to the bit stream of the search request data. The control unit 340 searches for the bit stream of the memo data corresponding, but not equal, to the bit stream of the search request data so as to retrieve the memo data having a same meaning, or visual pattern, regardless of a size of the memo data or a size of how the memo data was inputted by the user.

For example, suppose that a character "A" has been converted into a bit stream. The character "A" written in a first size is converted into a bit stream of "1111000011110011", while the character "A" written in a second size is converted into a bit stream of "11001101" (assuming that the second size is half of the first size). These two bit streams represent the same character "A" in spite of the difference in size. Accordingly, the bit streams composed of the continuous and discontinuous elements in a same order and which are proportional to each other are regarded as being identical memo data. Accordingly, the control unit 340 searches the memo index DB for the bit stream of the memo data corresponding to the bit stream of the search request data in step S550, as noted above.

Next, in step S560, the control unit 340 determines whether a bit stream of the memo data matching the bit stream of the search request data is found. If there is a matching bit stream of the memo data, the control unit 340 displays the found memo data on the display unit 332 in step S570. Otherwise, if there is no matching bit stream of the memo data, then the control unit 340 displays an alarm message notifying of no match being found on the display unit 332 in step S580.

FIGS. 6A to 6D are diagrams illustrating principles of converting memo data into bit streams in a handwritten memo data management method according to an exemplary embodiment of the present invention.

Figure 6A:
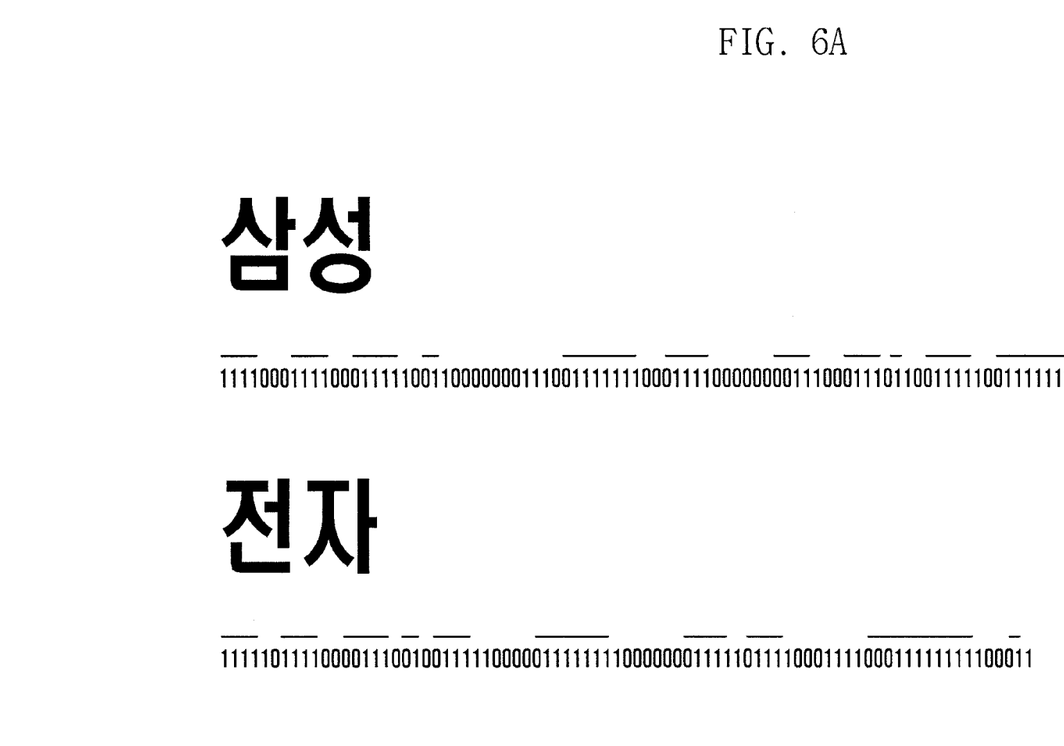
FIGS. 6A to 6D are diagrams illustrating principles of converting memo data into bit streams in a handwritten memo data management method according to an exemplary embodiment of the present invention.
Figure 6B:
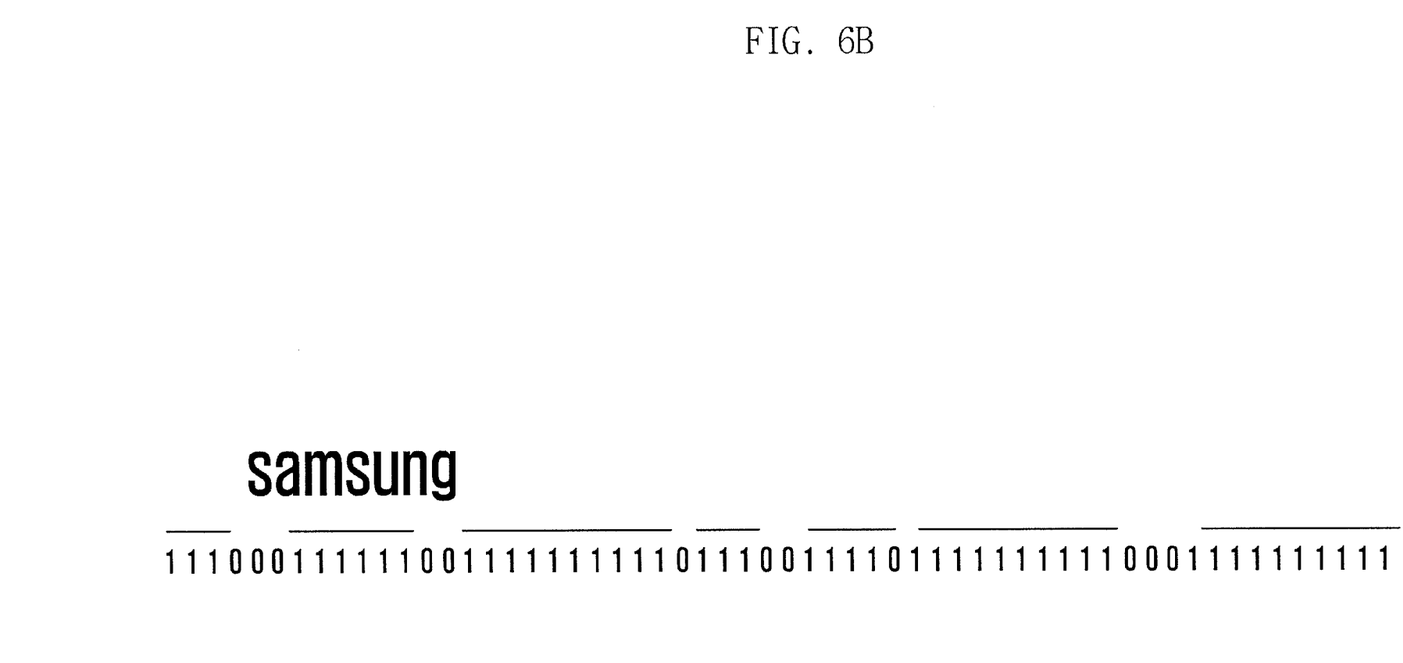
Figure 6C:
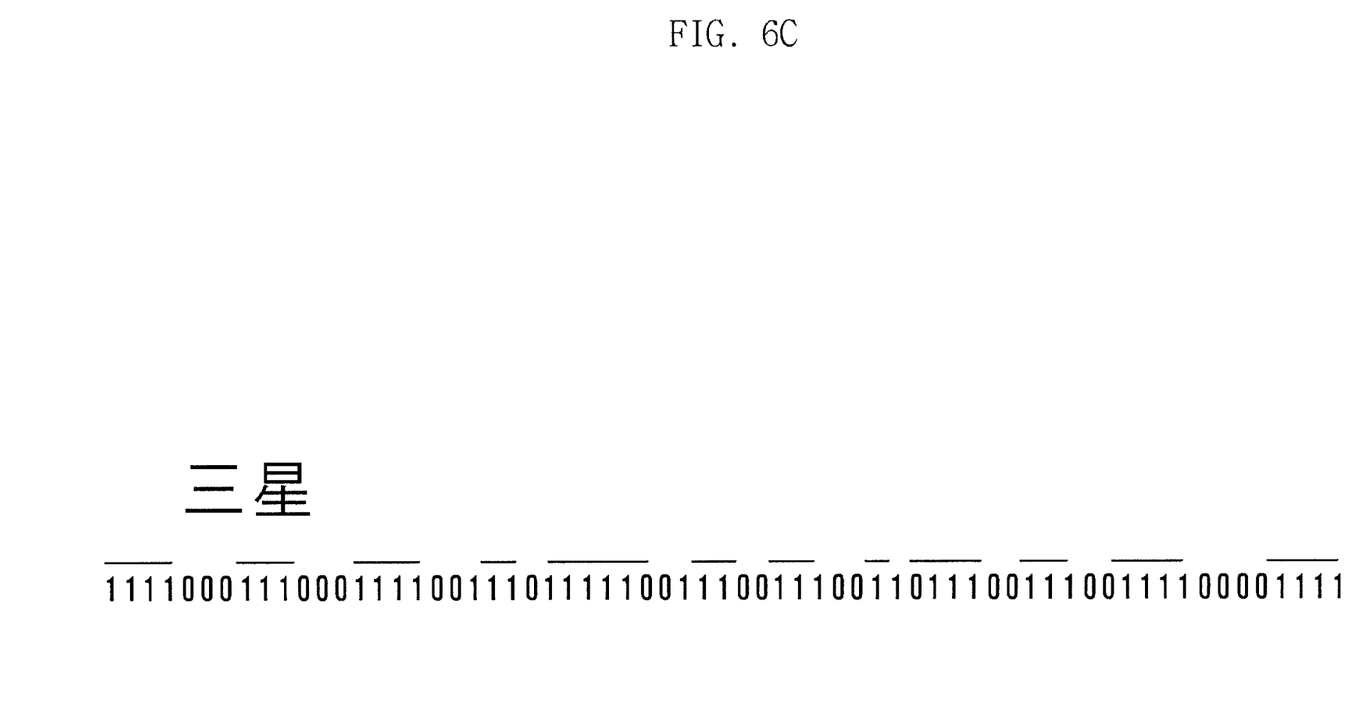
Figure 6D:
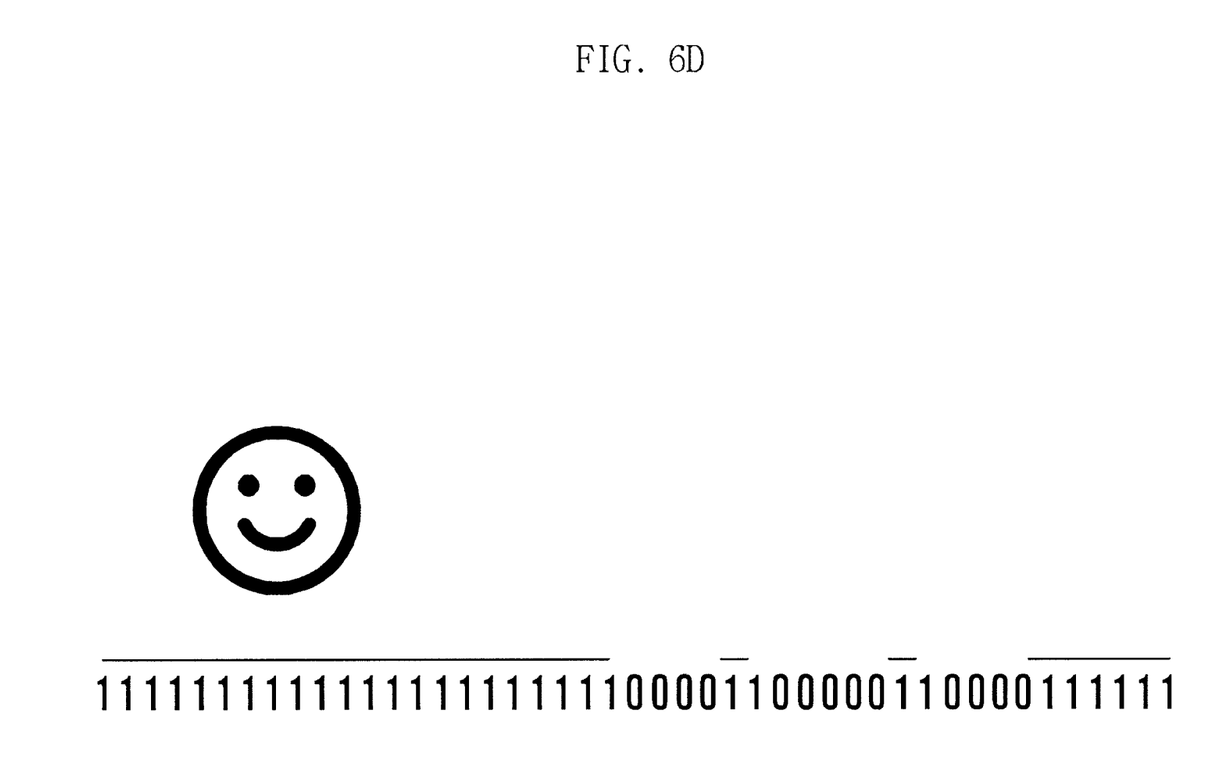

Referring to FIGS. 6A to 6D, FIG. 6a shows conversion of a Korean word "삼성전자" into a bit stream, FIG. 6B shows conversion of an English word "samsung" into a bit stream, FIG. 6C shows conversion of a Chinese word "그모" into a bit stream, and FIG. 6D shows conversion of a drawing of a smiley face into a bit stream. The respective bit streams of FIGS. 6A to 6D may be stored as memo data, and each of the respective memo data may be decomposed into continuous and discontinuous elements. The converted bit streams are stored in the memo index DB as memo data. The conversions of the respective words and drawings of FIGS. 6A to 6D into corresponding bit streams is performed according to the procedures of the exemplary embodiments of FIGS. 4A and 4B.

Figure 7:
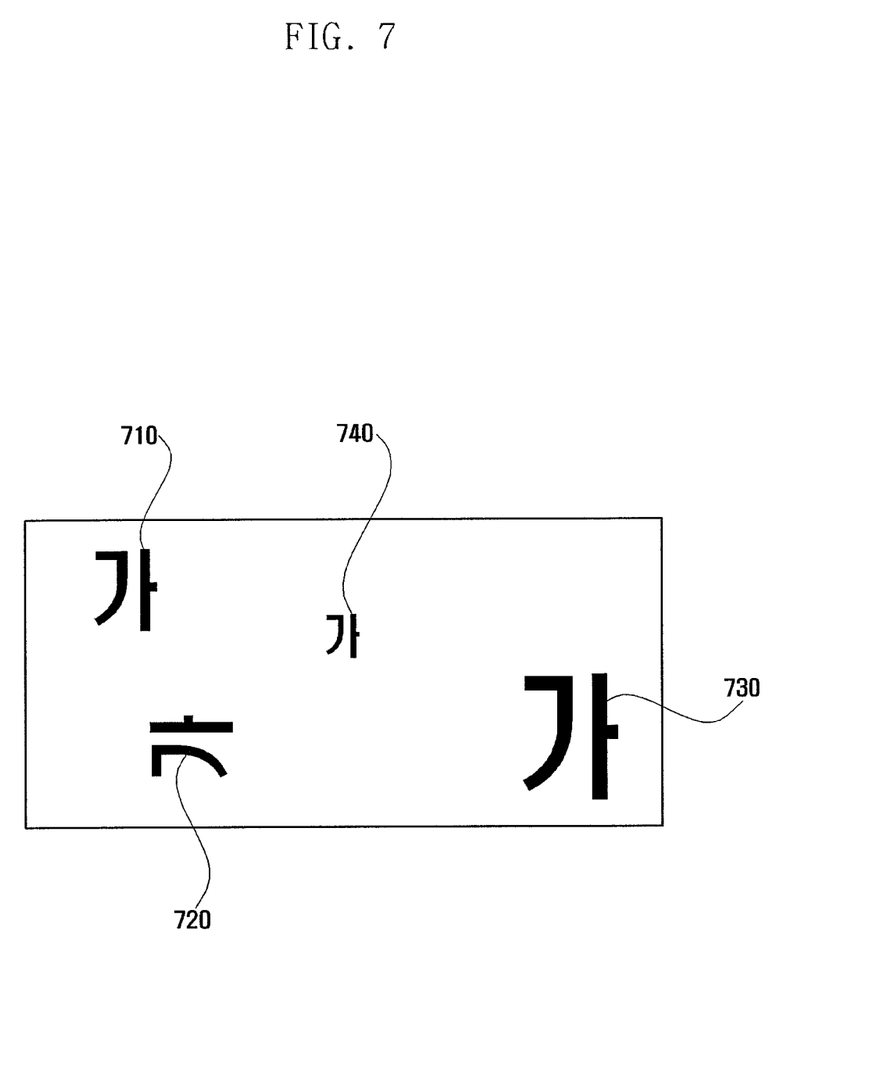
FIG. 7 is a diagram illustrating a principle of searching for a memo data regardless of an orientation and a size of the memo data in a handwritten memo data management method according to an exemplary embodiment of the present invention.

FIG. 7 is a diagram illustrating a principle of searching for a memo data regardless of an orientation and a size of the memo data in a handwritten memo data management method according to an exemplary embodiment of the present invention.

Referring to FIG. 7, a case where the user requests for a search of the memo data "가" 710 is illustrated. In the present exemplary embodiment of the present invention, since the memo data are decomposed into continuous and discontinuous elements which are stored as a bit stream representing the continuous and discontinuous elements. Accordingly, the memo data "가" 720, which is oriented in a different direction than the similar memo data "가" 710, is converted into the same bit stream as the memo data "가" 710. Accordingly, the memo data are searched regardless of orientation in the present exemplary embodiment of the present invention. Similarly, a memo data "가" 730 and a memo data "가" 740, which have different sizes than the memo data "가" 710 and "가" 720, are converted into bit streams having a similar pattern as the bit streams corresponding to the memo data "가" 710 and "가" 720. Accordingly, the memo data is searchable regardless of a size of the memo data.

In the present exemplary embodiment of the present invention as described above, the memo data search is performed in such a manner so as to retrieve the memo data corresponding to the bit stream converted from a search-requested memo data. Accordingly, proportions of respective continuous and discontinuous elements of the memo data having a same meaning as the search-requested memo data are maintained, and thus, it is possible to search for the memo data regardless of its size in comparison to a size of the search-requested memo data.

As described above, a handwritten memo data management method and apparatus according to the above described exemplary embodiments of the present invention is capable of facilitating a search of handwritten memo data by decomposing handwritten memo data into continuous and discontinuous elements and storing the memo data in the form of a bit stream representing respective lengths of the continuous and discontinuous elements. Also, the handwritten memo data management method and apparatus according to the above described exemplary embodiments of the present invention is capable of storing and searching for the memo data regardless of an orientation and a size of the memo data.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A memo data search method, the method comprising:
   receiving an input of memo data;
   storing the memo data in the form of a bit stream;
   searching, when a search for the memo data is requested, a memo index database for the memo data; and
   displaying a search result,
   wherein the storing of the memo data comprises:
     converting, when a continuous element of the memo data is detected, the continuous element into a segment of the bit stream, the segment having a length proportional to a length of the continuous element, wherein each bit of the segment of the bit stream corresponding to the continuous element has a bit value of 1; and
     converting, when a discontinuous element of the memo data is detected, the discontinuous element to another segment of the bit stream, the other segment having a length proportional to a length of the discontinuous element, wherein each bit of the other segment of the bit stream corresponding to the discontinuous element has a bit value of 0.

2. The method of claim 1, wherein the converting of the continuous element comprises:
   detecting a first touch initiation point and a first touch release point;
   determining a drag path between the first touch initiation point and the first touch release point;
   calculating a length of the drag path; and
   converting the continuous element into the segment of the bit stream which has the segment length proportional to a length of the drag.

3. The method of claim 2, wherein the converting of the discontinuous element comprises:
   detecting the first touch release point and a second touch initiation point;
   calculating a length of a straight line between the first touch release point and the second touch initiation point; and
   converting the discontinuous element into the other segment of the bit stream which has the other segment length proportional to the length of the straight line.

4. The method of claim 2, further comprising storing, when no second touch is detected after the first touch release, the segment of the bit stream which is converted from the continuous element in the memo index database.

5. The method of claim 1, wherein the searching of the memo index database comprises:
    converting the search-requested memo data into a search-requested bit stream; and
    searching the memo index data base for memo data corresponding to the search-requested bit stream of the search-requested data.

6. The method of claim 1, wherein the memo data is entered by handwriting on a touch sensitive device.

7. The method of claim 1, wherein a length of the bit stream is proportional to a size of the input of the memo data.

8. The method of claim 7, wherein the displaying of the search result comprises displaying stored memo data corresponding to a stored bit stream having a different size than, but proportional to, the bit stream of the memo data.

9. The method of claim 1, wherein an orientation of the input of the memo data does not affect the content of the bit stream of the memo data.

10. A memo data search apparatus, the apparatus comprising:
    an input unit receiving an input of memo data;
    a display unit displaying a searched memo data;
    a storage unit, including a hardware memory, including a memo index database, storing information on the memo data; and
    a control unit, including a processor, controlling converting the memo data into a bit stream, storing the bit stream in the memo index database, searching, when a search for the memo data is requested, the memo index database for the search-requested memo data, and displaying a search result on the display unit,
    wherein the control unit controls converting, when a continuous element of the memo data is detected, the continuous element into a segment of the bit stream having a length proportional to a length of the continuous element, wherein each bit of the segment of the bit stream corresponding to the continuous element has a bit value of 1,
    wherein the control unit controls converting, when a discontinuous element of the memo data is detected, the discontinuous element into another segment of the bit stream having a length proportional to a length of the discontinuous element, wherein each bit of the other segment of the bit stream corresponding to the discontinuous element has a bit value of 0.

11. The apparatus of claim 10, wherein the control unit controls detecting a first touch initiation point and a first touch release point, determining a drag path between the first touch initiation point and the first touch release point, calculating a length of the drag path, and converting the continuous element that corresponds to the drag path into the segment of the bit stream which has the length proportional of the length of the drag.

12. The apparatus of claim 11, wherein the control unit controls detecting the first touch release point and a second touch initiation point, calculating a length of a straight line between the first touch release point and the second touch initiation point, and converting the discontinuous element into the other segment of the bit stream which has a length proportional to a length of the straight line.

13. The apparatus of claim 11, wherein the control unit controls storing, when no subsequent touch is detected after the first touch release, the segment of the bit stream which is converted from the continuous element in the memo index database.

14. The apparatus of claim 10 wherein the control unit controls converting the search-requested memo data into a bit stream and searching the memo index data base for memo data corresponding to the bit stream of the search-requested memo data.

15. The apparatus of claim 10, wherein the memo data is entered by handwriting on the display unit.

16. The apparatus of claim 10, wherein a length of the bit stream is proportional to a size of the input of the memo data.

17. The apparatus of claim 16, wherein the display unit displays the searched memo data corresponding to a stored bit stream having a different size than, but proportional to, the bit stream of the memo data.

18. The apparatus of claim 10, wherein an orientation of the input of the memo data does not affect the content of the bit stream of the memo data.

* * * * *